April 22, 1930.  J. S. FIELDING  1,755,247
AGRICULTURAL DEVICE
Filed Oct. 15, 1926   3 Sheets-Sheet 1
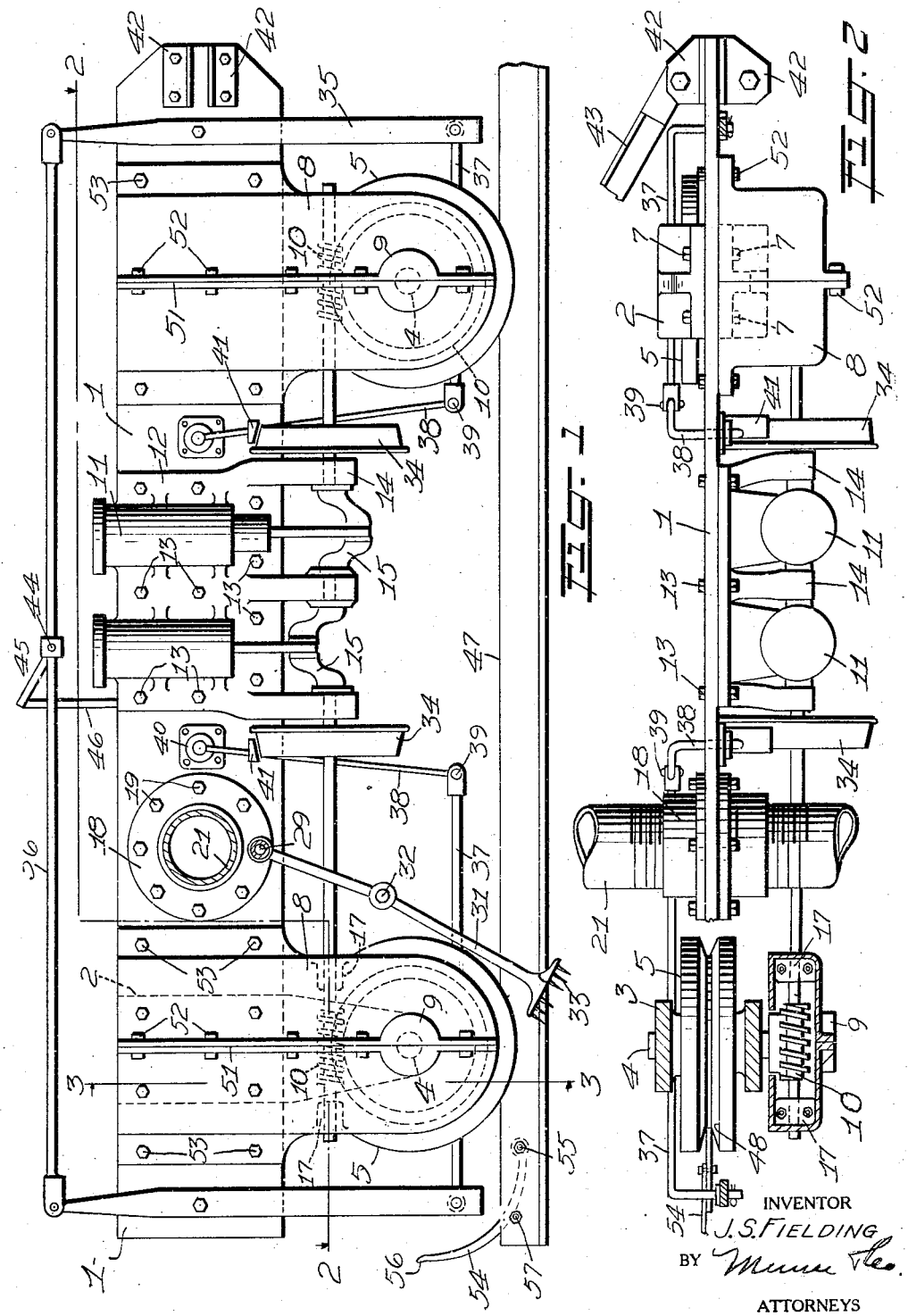
INVENTOR
J.S. FIELDING
BY
ATTORNEYS April 22, 1930.  J. S. FIELDING  1,755,247
AGRICULTURAL DEVICE
Filed Oct. 15, 1926  3 Sheets-Sheet 2
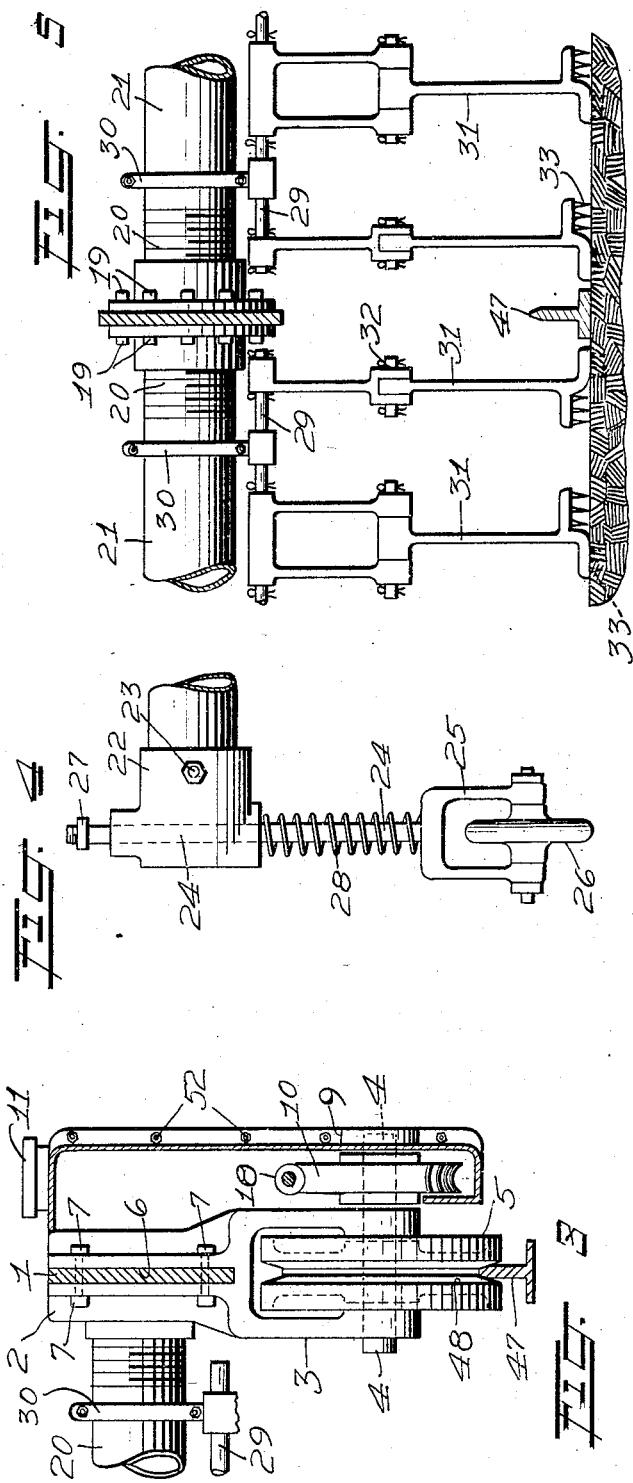
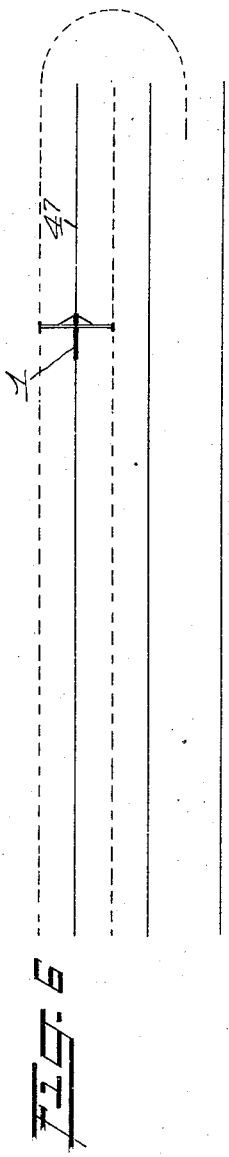
INVENTOR
J. S. FIELDING
BY
ATTORNEYS April 22, 1930.   J. S. FIELDING   1,755,247
AGRICULTURAL DEVICE
Filed Oct. 15, 1926   3 Sheets-Sheet 3
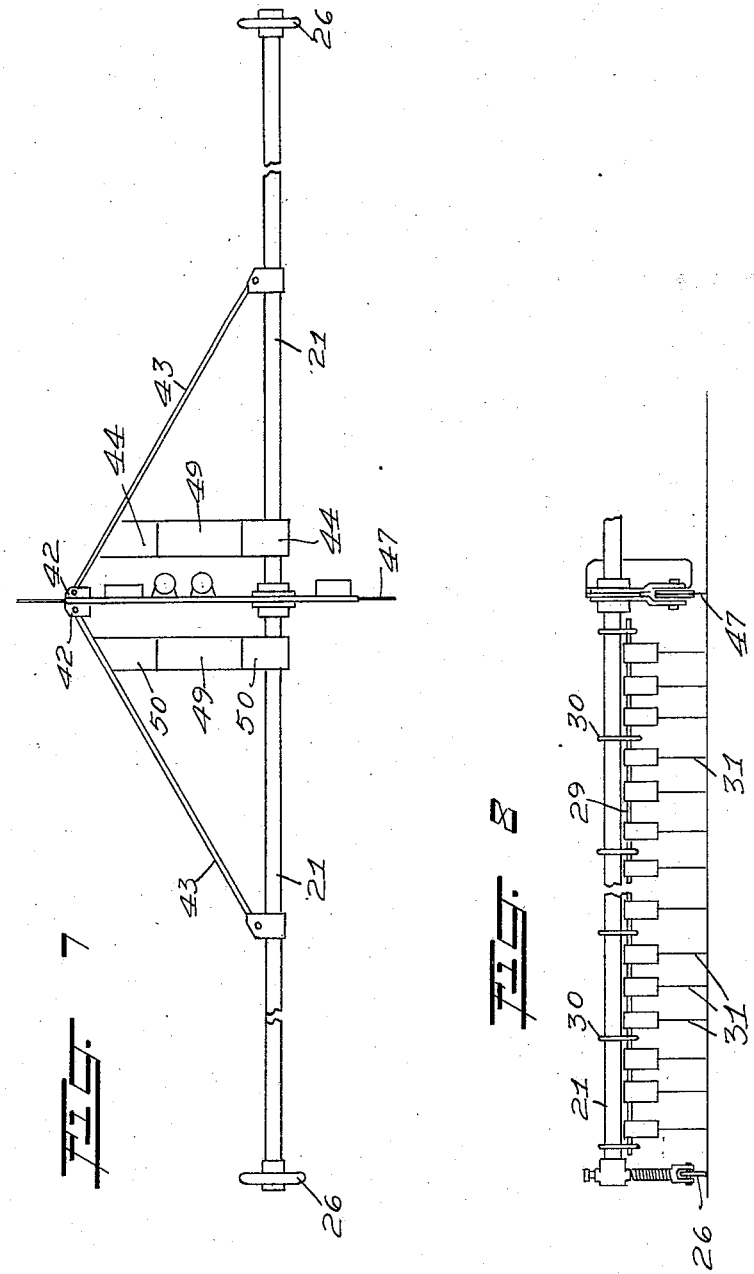
INVENTOR
J. S. FIELDING
BY
ATTORNEYS Patented Apr. 22, 1930

1,755,247

UNITED STATES PATENT OFFICE

JOHN SAMUEL FIELDING, OF EAST GARY, INDIANA

AGRICULTURAL DEVICE

Application filed October 15, 1926. Serial No. 141,791.

My invention relates to improvements in agricultural devices, and it consists in the combinations, constructions, and arrangements herein described and claimed.

An object of my invention is to provide a mechanism which may be used in various agricultural operations, such as seeding, discing, plowing, rolling, harrowing, cultivating or pulverizing the soil, and in which the operation can be conducted at a minimum of expense.

A further object is to provide a device which dispenses with the labor that would be ordinarily necessary in working a field, since the operation of the device is largely automatic.

A further object of the invention is to provide a device which will work a field backwardly and forwardly without any supervision from the operator other than to start it and to stop it at the end of the period when the ground has been thoroughly worked.

A further object is to provide a device which may be set in motion to traverse a field in one direction, and which is automatically reversed so as to travel backwardly in the same path, and which is provided with tools which automatically reverse their positions so as to work the ground either in a forward or reverse movement.

Other objects and advantages will appear in the following specification, and the novel features of the invention will be particularly pointed out in the appended claims.

My invention is illustrated in the accompanying drawings, forming part of this application, in which Figure 1 is a side view of a device constructed according to my invention, Figure 2 is a section of a portion of the device along the line 2—2 of Figure 1, Figure 3 is a section along the line 3—3 of Figure 1, Figure 4 is a detail view showing one of the supporting wheels and its mounting, Figure 5 is a detail view showing the arrangement of the tools and their mounting, Figure 6 is a diagrammatic view of a field, showing the tracks and the manner in which the device is shifted from one track to another, Figure 7 is a diagrammatic plan view of the device, and Figure 8 is a diagrammatic end elevation, showing the arrangement of the tools.

In carrying out my invention, I provide a main central supporting beam 1, having secured thereto near its ends castings 2, having wheels 5 mounted at their lower ends. These castings 2 are provided with extensions 3, which are adapted to receive a shaft 4 upon which are rotatably mounted the wheels 5. The upper ends of the casings are provided with a recess 6 which receives the central supporting beam 1. These castings are secured to the central supporting beam 1 by means of bolts 7. A casing 8 is disposed on one side of each casting, the lower portion of casing 8 being provided with an enlarged portion 9 adapted to secure one end of the shaft 4. Upon this shaft 4 is secured a worm gear 10. On one side of the central supporting member 1, I have secured a motor 11. The motor is secured to the central member 1 by means of a casting 12, having bolts 13 extending therethrough. To the lower portion of this casting I have provided downwardly extending supporting members 14, which provide bearing supports for the crankshaft 15. The crankshaft 15 is disposed parallel with the central supporting member 1 and is supported at its opposite ends by the casing 8. The portion of the crankshaft 15 which is disposed within the casing 8 is supported by means of bearings 17. A worm 10', which is secured to each end of the shaft 15, is in engagement with the worm gear 10.

Disposed on each side of the central supporting member 1 are two companion flanges 18. These flanges are secured to the central supporting member by means of bolts 19. The purpose of the companion flanges is to receive a threaded portion 20 of a work-arm 21. At the opposite ends of the work-arm 21 I have provided a casting 22, which is secured to the work-arm by means of bolts 23. The casting 22 is adapted to slidably receive a stem 24, which is forked at 25 to receive a wheel 26. The upper portion of the stem 24 is threaded to receive a nut 27. Between the casting 22 and the fork 25 is provided a spring 28, the lower end of which is disposed on the fork 25 and the upper end of which adjustably supports the outer end of the work-arm 21. A companion work-arm 29 is secured to the work-arm 21, by means of bands 30. The work-arm 21 and the companion arm 29 are disposed at right angles to the main supporting member 1. The supporting members 29 are adapted to carry tools 31. The tools 31 are pivotally secured to the work-arm 29 and are provided with a pivot at 32. The lower portions of the tools 31 are provided with teeth 33 which are adapted to drag across the surface of the field.

It will be observed that I have provided a pair of brake drums 34 which are secured to the crankshaft 15. A vertical member 35 is pivotally secured to each end of the central supporting member 1. The upper ends of the vertical members 35 are operatively connected by means of a rod 36. The lower ends of the members 35 have pivotally secured thereto arms 37. A substantially vertical arm 38 is pivotally secured to the arms 37 at 39. The upper end of the arm 38 is pivotally supported by a boss 40, which is secured to one side of the central supporting member 1. That portion of the arm 38 which is received by the boss 40 is bent downwardly and has secured at its extreme end a brake member 41.

To one end of the central supporting member, I have secured plates 42. The purpose of these plates is to receive one end of a pair of supporting structures 43 which are secured to the work-arm 21, as shown in Figure 7.

Secured to the rod 36 at 44 is an arm 45, which is secured to a companion member 46, which is in operative engagement with a reversing device not shown.

It will be observed that I have provided a T-rail 47. The wheels 5 are provided with flanges 48 which are adapted to receive the T-rail 47. A series of these rails are laid upon the ground and are secured thereto in any suitable manner, as shown in Figure 6.

Referring now particularly to Figure 7, it will be observed that I have provided a platform 49 on each side of the central supporting member. One end of this platform is supported by means of the work-arm 21 and the other end is supported by means of the bracing structure 43. Upon this platform I have provided ballast boxes indicated generally at 44′, the purpose of which is to supply a sufficient tractive resistance. Upon the other side of the platform I have provided fuel-retaining containers 50.

The casings 8, as will be observed, are made in two parts and are secured together at 51 by means of bolts 52. The casings 8 are secured to the central member 1 by means of bolts 53.

At each end of the rails 47 I have provided a resilient member 54, pivotally secured at 55. The end 56 of the member 54 is held in a substantially upright position by means of a bolt 57.

The casings 8, it will be observed, provide a dust protection for the worm 10′ and the worm gear 10.

From the foregoing description of the various parts of the device, the operation thereof may be readily understood. Assume now that the device is disposed upon the rail 47 and the motor 11 has been started. This will in turn actuate the crankshaft 15, which in turn drives the worm 18 which is in engagement with the worm gear 10. The worm gear 10 which is fixed to the shaft 4 will then revolve the wheels 5, which are in engagement with the T-rail 47. As the device moves along upon the rails, it will be observed that the tools 31, which are suspended from the rod 29, will pull along upon the surface of the ground, thereby cultivating the field. The outer ends of the work-arm 21 are supported by means of the wheels 26. The spring 28 provides an adjustable means for preventing the work-arm 21 from sudden shock and vibration due to the unevenness of the ground surface. Assuming now that the device has reached the end of the rail, one of the vertical members 35 will then engage with the resilient member 54. This will tend to move the arm 37 inwardly; that is, in the direction of the drum, thereby forcing the brake 41 against the surface of the brake drum 34, and stopping the device. At this point it will be noted that when the vertical member 35 is forced inwardly, the upper end of the vertical member 35 will be forced outwardlly, thereby actuating the reversing member 46. This will then reverse the motor. The motor in being reversed will reverse the rotation of the worm and will, therefore, reverse the direction in which the device was traveling. The device will then continue until the vertical member 35 has engaged with the resilient spring member 54, which is secured to the other end of the rail.

It will be observed that the tools 31, which are hinged at 32, drag along the surface of the ground. When the device is reversed, the pivot 32 provides the flexibility whereby the tools are reversed in accordance with the direction in which the device is traveling. Only one-half of the teeth on the tools 31 are in operation while the device is traveling in one direction. When the device is reversed, the other half of the teeth is then used, see Figure 1. It is apparent, however, that any suitable tools may be provided.

Referring now to Figure 6, when the field has been sufficiently cultivated, the device may be transferred to another rail. In order to permit the device to run off the end of the rail, the resilient member 54 is dropped down by removing the bolt 57 from the rail 47.

One end of the device is now swung around by any suitable power, such as by horses, or mechanical means.

I claim:

1. An agricultural device comprising a vehicle, power means for propelling the vehicle, means for reversing the power means, work arms carried by the vehicle and extending laterally therefrom, and a series of reversible tools carried by the work arms, said tools having two sets of working points, one set being brought into play during the movement of the vehicle in one direction and the other set being brought into play automatically during the movement of the vehicle in the opposite direction.

2. In an agricultural device, a power driven vehicle, and reversible tools carried by the vehicle for cultivating the ground, each of said reversible tools having two sets of ground-working points, one of said sets being arranged to work a portion of the ground during the passage of the power driven vehicle in one direction and the other set being arranged to be reversed automatically and to work another portion of the ground when the vehicle is advancing in the opposite direction.

3. An agricultural device comprising a power driven vehicle having a pair of wheels arranged to run upon a single rail, work arms carried by the vehicle and extending laterally therefrom, guide means disposed at the ends of the work arms for supporting the vehicle, and reversible ground-working tools carried by the work arms and arranged to cultivate certain portions of the ground during the travel of the vehicle in one direction and to cultivate other portions of the ground during the reverse movement of the vehicle along its same path.

4. An agricultural device comprising a power-driven vehicle, laterally extending work arms carried by said vehicle, guide wheels at the ends of said work arms for supporting and guiding said vehicle, and a plurality of ground-working tools carried by said work arms and arranged to engage certain portions of the ground during the travel of the vehicle in one direction and to engage other portions of the ground during the reverse movement of the power-driven vehicle along its same path, each of said ground-working tools being pivotally mounted for permitting the tools to be automatically reversed while engaging the ground when the power-driven vehicle moves in an opposite direction.

5. In an agricultural implement, a power-driven vehicle, tools carried by said power-driven vehicle for engaging the ground, each of said tools having two sets of ground-working points, one of said sets being adapted to work a portion of the ground during the passage of the power-driven vehicle in one direction, and the other set being so disposed as to work another portion of the ground in the reverse movement, said tools being arranged to be automatically reversed by engaging the ground when the power-driven vehicle is moved in the opposite direction.

JOHN SAMUEL FIELDING.